(12) United States Patent
Brown (10) Patent No.: US 9,589,183 B2
(45) Date of Patent: Mar. 7, 2017

(54) SYSTEM AND METHOD FOR IDENTIFICATION AND EXTRACTION OF DATA

(71) Applicant: Parchment, Scottsdale, AZ (US)

(72) Inventor: Jason Brown, Lock Haven, PA (US)

(73) Assignee: PARCHMENT, INC., Scottsdale, AZ (US)

( * ) Notice: Subject to any disclaimer, the term of this patent is extended or adjusted under 35 U.S.C. 154(b) by 19 days.

(21) Appl. No.: 14/552,099

(22) Filed: Nov. 24, 2014

(65) Prior Publication Data

US 2015/0146984 A1   May 28, 2015

Related U.S. Application Data

(60) Provisional application No. 61/907,840, filed on Nov. 22, 2013.

(51) Int. Cl.
*G06K 9/00* (2006.01)
*G06K 9/18* (2006.01)
*G06F 17/30* (2006.01)

(52) U.S. Cl.
CPC ......... *G06K 9/00442* (2013.01); *G06F 17/30* (2013.01); *G06K 2209/01* (2013.01)

(58) Field of Classification Search
CPC .......................... G06K 9/00442; G06F 17/30
See application file for complete search history.

(56) References Cited

U.S. PATENT DOCUMENTS

2010/0150448 A1* 6/2010 Lecerf ................. G06F 17/3061
382/190
2014/0369602 A1* 12/2014 Meier ................ G06K 9/00463
382/182

* cited by examiner

*Primary Examiner* — David F Dunphy
(74) *Attorney, Agent, or Firm* — Sheridan Ross P.C.

(57) ABSTRACT

A system and method of for describing target data as a sequence of pattern elements and pattern element groups that comprise an overall target pattern is described. Pattern elements may utilize regular expression syntax along with other metadata that describe the behavior of the element. A pattern element group may be a collection of fully defined pattern elements where at least one pattern element from the group must have a match for the overall pattern to match. Patterns contain both pattern elements and pattern element groups. The general process involves first performing optical character recognition (OCR) on the document, which in turn produces a sequence of text tokens representing the lines of text on each page of the document. The search algorithm may then apply each defined pattern to the entire document capturing and/or extracting data that match each pattern's required elements and element groups.

17 Claims, 11 Drawing Sheets

| Pattern Element | Regular Expression | MetaData | | |
|---|---|---|---|---|
| | | Required | Greedy | Discard |
| Course Number | \d\d\d([A-Z])? | YES | NO | NO |
| Course Title | (.)+ | YES | YES | NO |
| Pattern Group Element | | | | |
| Course Grade | [A-DF][+-]? | NO | NO | NO |
| Course Grade | [A-DF][+-]? | NO | NO | NO |
| Course Grade | [A-DF][+-]? | NO | NO | NO |
| Course Grade | [A-DF][+-]? | NO | NO | NO |
| Course Credits | \d(\.(\d)+)? | YES | NO | NO |

SYSTEM AND METHOD FOR IDENTIFICATION AND EXTRACTION OF DATA

CROSS REFERENCE TO RELATED APPLICATION

This application claims priority to U.S. Provisional Application No. 61/907,840, filed Nov. 22, 2013, entitled "System and Method For Identification And Extraction of Data", the entire disclosure of which is hereby incorporated by reference in its entirety for all that it teaches and for all purposes.

FIELD OF THE INVENTION

The present invention is generally directed toward identifying data in electronic documents according to one or more patterns and then extracting this data.

BACKGROUND

Electronic documents convey information in a variety of different manners. That is, information in an electronic document may be organized according to one or more formats; or, information may not be organized all. For example, most spreadsheets tend to organize, or provide, information according to a familiar row-column topology. Although meaningful relationships between the different rows and columns may not be defined, such information is often organized in a pre-defined manner and may be recognized as structured data. Structured data may also take the form of relational databases and data tables and is often made available in a predictable manner. As such, a pre-defined consistent organization of data may be relied upon when extracting information from an electronic document containing structured data. In other instances, information in electronic documents may be provided without a specified format; such information is generally classified as unstructured information. Unstructured information generally does not have a pre-defined data model or is not organized in a pre-defined manner. Unstructured data tends to be text heavy, may also contain data such as dates and numbers, and is often not predictable or arranged in a predictable format.

Information in an electronic document may also be provided in a semi-structured manner. That is, information in an electronic document may be organized in some manner, but not necessarily according to a consistent predefined or formal format. In some instances, semi-structured information may be provided in a table; however, all columns of a table may not necessarily be required and/or one or more columns may have extra fields or may contain data of varying formats, lengths, and encodings. Therefore, for an entity that wishes to receive this information and later make sense of this information, deciphering how the information is provided and/or extracting the information in a meaningful manner may prove to be difficult and may require large amounts of human verification.

SUMMARY

It is, therefore, one aspect of the present disclosure to provide a system and method whereby target data to be retrieved from an electronic document is identified according to one or more patterns. That is, the target data may be described as a sequence of pattern elements and pattern element groups that comprise the overall target pattern. One or more target patterns may then be relied upon to identify text in an electronic document such that data, or text, matching the target pattern may be extracted and utilized for some other purpose. Stated another way, embodiments of the present disclosure may utilize target patterns to identify and extract text according to a structure defined by the target pattern. Accordingly, text that is not arranged according to a consistent predefined structure may be identified, extracted, and utilized. Therefore, text from most electronic documents can be made available regardless of the type of document. As one example, an electronic document may be of the type that includes, but is not limited to, certificates, licenses, transcripts, credentials, or any other document in electronic form that provides a qualification, achievement, personal quality, and/or aspect of a person's background typically used to indicate, for example, that such a person is suitable for something, such as a job, position, rating, license, and/or to indicate a measure of one's level of knowledge.

For example, transcripts, such as academic transcripts, are available in a wide variety of formats from many different sectors. Embodiments of the present disclosure provide a system and method to extract information from transcripts without knowing ahead of time how data in a received transcript is arranged. For example, a transcript generally provides information representing courses that a person has taken, a grade for that course, and a semester or quarter in which the person has taken the course. There may be a number of ways the entity providing the transcript, such as a school, may arrange this information. For example, the information may be arranged such that an alphanumeric course number is provided, followed by a course title, grade, and the number of credits for the course. Alternatively, the information may be arranged such that a course title is provided, followed by a course number, the number of credits for the course and a grade. Accordingly, embodiments of the present disclosure provide a pattern recognition system that may learn patterns for course numbers, course titles, course credits, course grades and the different combinations that together represent a course.

In accordance with at least some embodiments of the present disclosure, the general process of identifying and extracting text from an electronic document involves performing optical character recognition (OCR) on the electronic document, which in turn produces a sequence of text tokens representing the lines of text on each page of the electronic document. A search algorithm then applies each defined pattern to the entire electronic document capturing any data and headings that match each pattern's required elements and element groups. Spatial analysis may then be performed to group the data within the appropriate heading. In the event that one or more pattern elements are not recognized, a requisite new pattern may be developed and added to the system so that the system may properly identify the data that is present the next time it is encountered.

As one example, an OCR process may be applied to an electronic document comprising a course transcript to produce a sequence of text tokens representing the lines of text on each page of the transcript. A search algorithm then applies each defined pattern residing in a pattern store to the entire electronic document capturing academic course data and academic semester headings that match each pattern's required elements and element groups. Spatial analysis is then performed to group the course data within the semester to which the data belongs.

Of course, embodiments of the present disclosure are not limited to academic transcripts. That is, pattern analysis techniques in accordance with embodiments of the present disclosure may be utilized to identify data from any electronic document according to the one or more patterns. Moreover, such identified data may then be extracted, modified, or utilized in some manner. For example, embodiments of the present disclosure may be utilized to identify data in the following non-limiting examples: statements, bills, settlements, receipts, medical codes and bills, and other electronic documents.

In one aspect of the present disclosure, a system for identifying and extracting text from an electronic document is described. The system may include one or more processors, memory, and a text identifier and extractor that receives the electronic document, generates a stream of text tokens based on the electronic document, matches a pattern to a portion of the stream of text tokens, and outputs the text in accordance with the matched pattern.

In yet a further aspect of the present disclosure, a method for identifying and extracting text from an electronic document, is provided; the method may include receiving, at a text identifier and extractor, the electronic document, generating a stream of text tokens based on the electronic document, matching a pattern to a portion of the stream of text tokens, and outputting the text in accordance with the matched pattern.

In yet a further aspect of the present disclosure, a computer readable storage medium comprising processor executable instructions operable to perform the method of the following steps is provided. The method may include receiving, at a text identifier and extractor, an electronic document, generating a stream of text tokens based on the electronic document, matching a pattern to a portion of the stream of text tokens, and outputting the text in accordance with the matched pattern.

The Summary is neither intended nor should it be construed as being representative of the full extent and scope of the present invention. The present invention is set forth in various levels of detail in the Summary as well as in the attached drawings and in the detailed description of the invention and no limitation, as to the scope of the present invention, is intended by either the inclusion or non inclusion of elements, components, etc. in the Summary. Additional aspects of the present invention will become more readily apparent from the detailed description, particularly when taken together with the drawings.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention may be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It should be understood that various changes may be made in the function and arrangement of elements without departing from the spirit and scope of the appended claims.

Furthermore, while embodiments of the present disclosure will be described in connection with various electronic document examples, it should be appreciated that embodiments of the present disclosure are not so limited. In particular, embodiments of the present disclosure may be applied to any data source where the identification of data corresponds to one or more patterns, in which such patterns may be stored in a pattern store. For instance, embodiments of the present invention may be utilized to process invoices, bills, receipts, medical billing documents, statements, settlements, credentials, and other electronic documents. In accordance with at least one embodiment of the present disclosure, a credential may be an attestation of qualification, competence, or authority issued to an individual by a third party with a relevant or de facto authority or assumed competence to do so. Non-limiting examples of credentials include academic diplomas, academic degrees, certifications, security clearances, identification documents, badges, passwords, user names, keys, and so on. The usage of one particular electronic document, such as an academic transcript, an invoice, a license, and/or a certificate, is for illustrative purposes only and should not be construed as limiting the claims.

Figure 1:
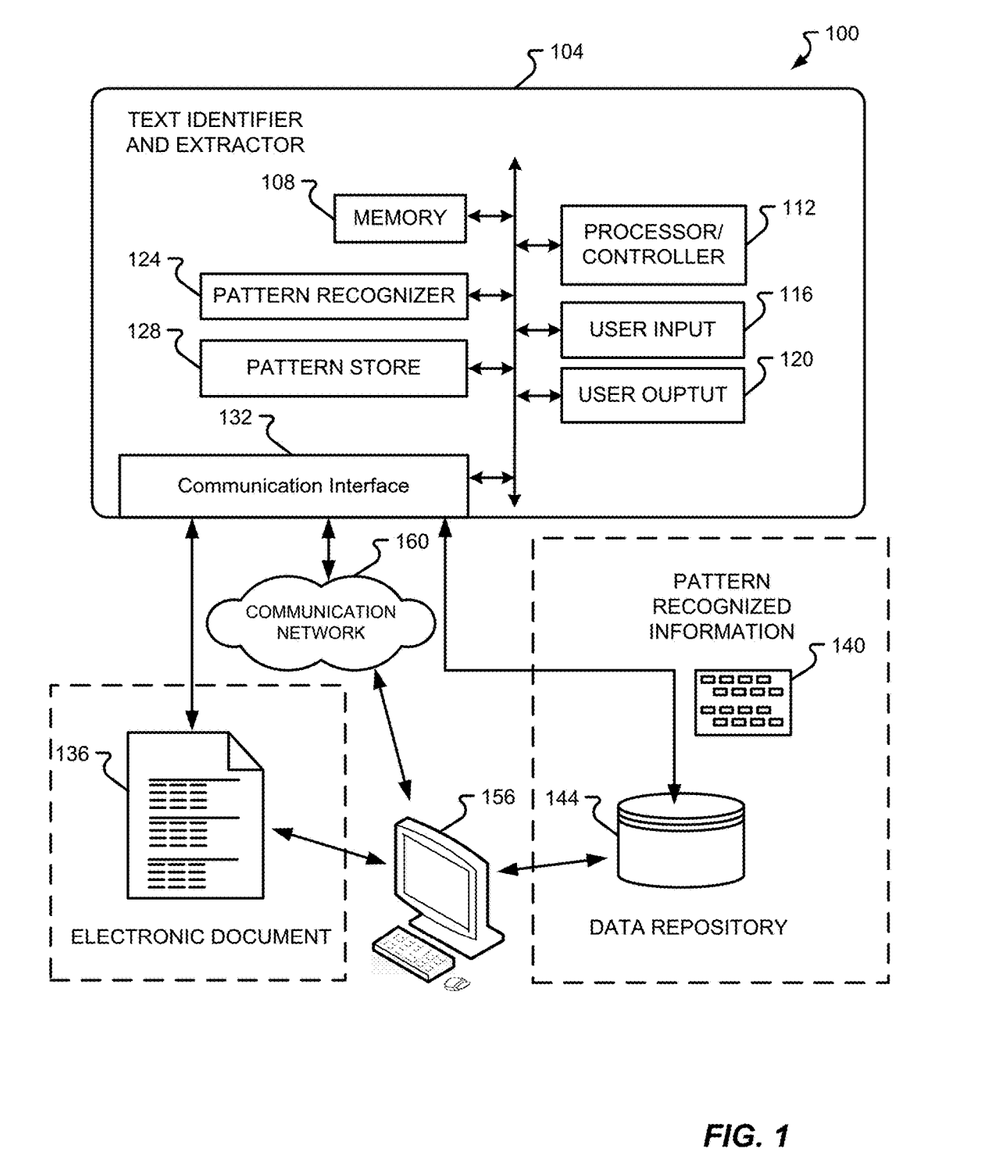
FIG. 1 depicts a text identification and extraction system in accordance with embodiments of the present disclosure.

Referring initially to FIG. 1, details of a text identification and extraction system 100 are depicted in accordance with at least some embodiments of the present disclosure. The text identification and extraction system 100 generally includes a Text Identifier and Extractor 104 that receives an electronic document 136. The electronic document 136 may be provided in a variety of different formats. For example, the electronic document 136 may include, but is not limited to formats, such as a text document, a spreadsheet document, a webpage, an academic transcript, a receipt, a bill, a statement, and/or an image of any one of the previously mentioned electronic documents. As previously mentioned, the electronic document 136 may be a credential, such as but not limited to an academic diploma, academic degree, certification, security clearance, identification document, badge, password, user name, and/or key. Alternatively, or in addition, the electronic document 136 may be provided in a file format used to represent documents independent of a software application, hardware, or operating system; such formats may include but are not limited to the portable document format (pdf) and the XML paper specification (xps). Alternatively, or in addition, the electronic document 136 may be provided by a data repository 144; in such an instance, the electronic document 136 may be optional as indicated in FIG. 1.

Upon receiving the electronic document 136, the Text Identifier and Extractor 104 may perform an optical character recognition (OCR) process to identify text in the electronic document 136. The OCR process may produce a sequence of text tokens representing the lines of text on each page of the electronic document 136. For example, for each line of text on a page, a separate token representing the text for that line may be generated. In some instances, multiple tokens may be generated for a single line. In other instances, a single token may be generated for multiple lines of an electronic document 136.

In addition, a text verification process may be utilized. For example, an electronic document 136, such as a PDF document may be provided that contains actual text (native text); in such an instance, an OCR verification process may be utilized to ensure that every token, and/or character identified by the OCR process is accounted for, or otherwise exists, in the actual text. Stated another way, the tokens recovered by the OCR process may be compared to text characters provided with the electronic document 136. If any discrepancy between the tokens identified in the OCR process and the text provided with the electronic document 136 are found, a separate discrepancy process may be initiated to localize and resolve such a discrepancy. That is, the OCR process identifies and provides one or more spatial relationships that may exist between text tokens (e.g., textual layout). If the native text provided with the electronic document does not include textual location information, the OCR process provides such information.

Upon receiving the electronic document 136 that has been subjected to OCR, the Text Identifier and Extractor 104 may process the electronic document 136 utilizing one or more patterns from a pattern store 128. For example, and as will be described later, the Text Identifier and Extractor 104 may utilize patterns according to one or more document classifications. For instance, if the Text Identifier and Extractor 104 is utilized to identify data from an academic transcript, the Text Identifier and Extractor 104 may utilize patterns identified for use with academic transcripts. As another example, if the Text Identifier and Extractor 104 is utilized to identify data from an insurance bill, the Text Identifier and Extractor 104 may utilize patterns identified for use with insurance bills. As another example, if the Text Identifier and Extractor 104 is utilized to identify data from a receipt, the Text Identifier and Extractor 104 may utilize patterns identified for use with receipts. As another example, if the Text Identifier and Extractor 104 is utilized to identify data from a credential, such as a certificate and/or license, the Text Identifier and Extractor 104 may utilize patterns identified for use with insurance bills. Moreover, the patterns may further be sub-classified based one or more logical groupings. For example, the Text Identifier and Classifier 104 may utilize a group or subgroup of patterns for an insurance bill originating from one of four insurance companies, may utilize a group or subgroup of patterns for a receipt from a specific vendor, may utilize a group or subgroup of patterns for an invoice from a specific vendor and/or to a specific client. As another example, the Text Identifier and Classifier 104 may utilize a group or subgroup of patterns for a specific type of credential, such as for a specific type of license, specific type of certificate, and/or a specific type of qualification.

Once the data has been identified according to the one or more patterns, depending on an application, the Text Identifier and Extractor 104 may then provide the Pattern Recognized Information 140 to a data repository 144. For example, the information may be sent to or otherwise associated with a user profile, such that a user associated with the user profile may access and/or send the recognized information to an entity, for instance, an academic institution or a potential employer. According to at least one embodiment, the user profile is an online user profile. According to at least one embodiment, the information is provided by the Text Identifier and Extractor 104 automatically and may be updated periodically. Alternatively, or in addition, the Pattern Recognized Information 140 may be provided back to the electronic document 136. Accordingly, the data repository 144 may be optional in such an implementation.

Additionally, the process of identifying and extracting text from an electronic document 136 may further include an additional analysis where the process identifies and classifies negative space, in the electronic document 136, to determine if there is additional information in the electronic document 136 that has not been identified and/or extracted. For example, if there are text tokens that have not been matched to a particular pattern, these text tokens may be utilized to create a new pattern and/or may be marked as un-captured data. In such an instance, the un-captured data may be provided to a separate review process where the data may be automatically reviewed and/or reviewed by a human analyst.

Referring again to FIG. 1, the Text Identifier and Extractor 104 may include a processor/controller 112 capable of executing program instructions. The processor/controller 112 may include any general purpose programmable processor or controller for executing application programming. Alternatively, or in addition, the processor/controller may comprise an application specific integrated circuit (ASIC). The processor/controller 112 generally functions to execute programming code that implements various functions performed by the associated Text Identifier and Extractor 104. The processor/controller 112 of the Text Identifier and Extractor 104 may operate to provide content, such as a result set of matching patterns and Pattern Recognized Information 140 to a data repository, such as the data repository 144.

The Text Identifier and Extractor 104 may additionally include memory 108. The memory 108 may be used in connection with the execution of programming instructions by the processor/controller 112, and for the temporary or long term storage of data and/or program instructions. For example, the processor/controller 112, in conjunction with the memory 108 of the Text Identifier and Extractor 104, may implement OCR processes, pattern recognition processes, web services, and other functionality that may be needed. The memory 108 of the Text Identifier and Extractor 104 may comprise or otherwise include solid state memory that is resident, removable and/or remote in nature, such as DRAM and SDRAM. Moreover, the memory 108 may comprise a plurality of discrete components of different types and/or a plurality of logical partitions. In accordance with still other embodiments, the memory 108 comprises a non-transitory computer readable storage medium. Such a medium may take many forms, including but not limited to, non-volatile media, volatile media, and transmission media.

In addition, user input devices 116 and user output devices 120 may be provided and used in connection with the Text Identifier and Extractor 104. For example, a user may enter information, or initiate a communication with the Text Identifier and Extractor 104 by directing the Text Identifier and Extractor 104 to process one or more electronic documents 136. Examples of user input devices 116 include a keyboard, a numeric keypad, a touch screen, a microphone, scanner, and pointing device combined with a screen or other position encoder. Examples of user output devices 120 include a display, a touch screen display, a speaker, and a printer. The Text Identifier and Extractor 104 also generally includes a communication interface 132 to allow for communication between a client device 156, such as a computer, tablet, mobile device or other device and the Text Identifier and Extractor 104 via a communication network 160. The communication interface may support 3G, 4G, cellular, WiFi, Bluetooth®, NFC, RS232, and RF, Ethernet, IPV4, IPV6, and the like.

Communication network 160 may comprise any type of known communication medium or collection of communication media and may use any type of protocols to transport messages between endpoints. The communication network 160 may include wired and/or wireless communication technologies. The Internet is an example of the communication network 160 that constitutes an Internet Protocol (IP) network consisting of many computers, computing networks, and other communication devices located all over the world, which are connected through many telephone systems and other means. Other examples of the communication network 160 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 160 need not be limited to any one network type, and instead may be comprised of a number of different networks and/or network types. Further, communication network 160 may also be referred to as the "cloud".

In some embodiments, the Text Identifier and Extractor 104 memory 108 may include software and/or hardware for implementing a pattern recognizer and a pattern store 128. As will be described later, in embodiments consistent with the present disclosure, the pattern recognizer 124 may search for one or more patterns of data to be found in an electronic document 136. In certain embodiments, one or more patterns may be selected from a central repository, such as a pattern store 128, for maintaining patterns to be chosen for a particular application.

Figure 2:
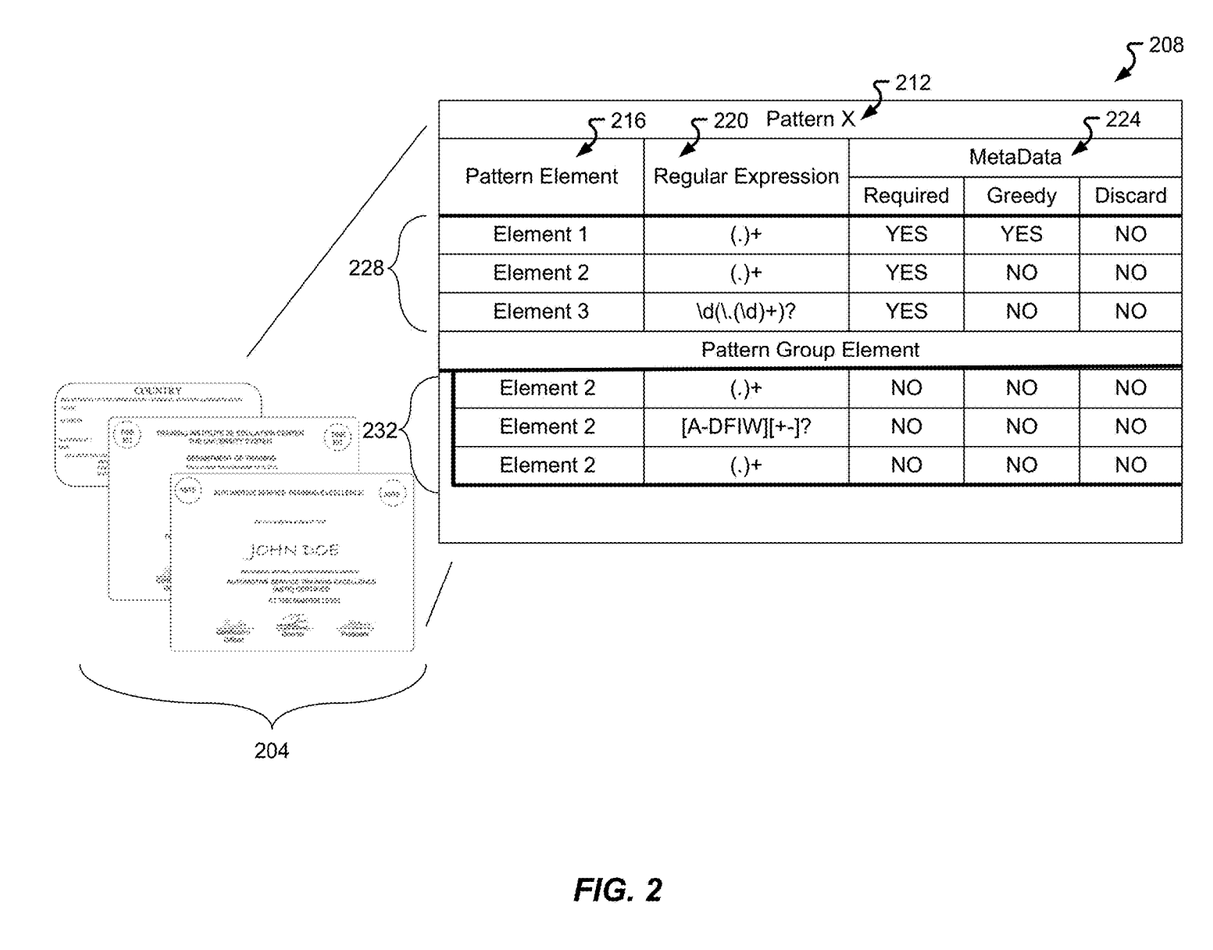
FIG. 2 illustrates a first example of a target pattern in accordance with embodiments of the present disclosure.

FIG. 2 depicts an example pattern 208 utilized in accordance with embodiments of the present disclosure. A pattern, such as Pattern X 212, as used herein, generally refers to a sequence, in order, of pattern elements 216 and optionally, one or more pattern element groups 232. A pattern element 216 is generally used herein to refer to a description of a single atom of data and may use regular expression syntax 220 along with other metadata 224 that describes the behavior of the pattern element 216. The pattern, such as pattern 212, may be specific to a type of document 204. As previously described, a document 204 may include but is not limited to a credential, a certificate, an invoice, a receipt, an academic transcript, etc.

Figure 3:
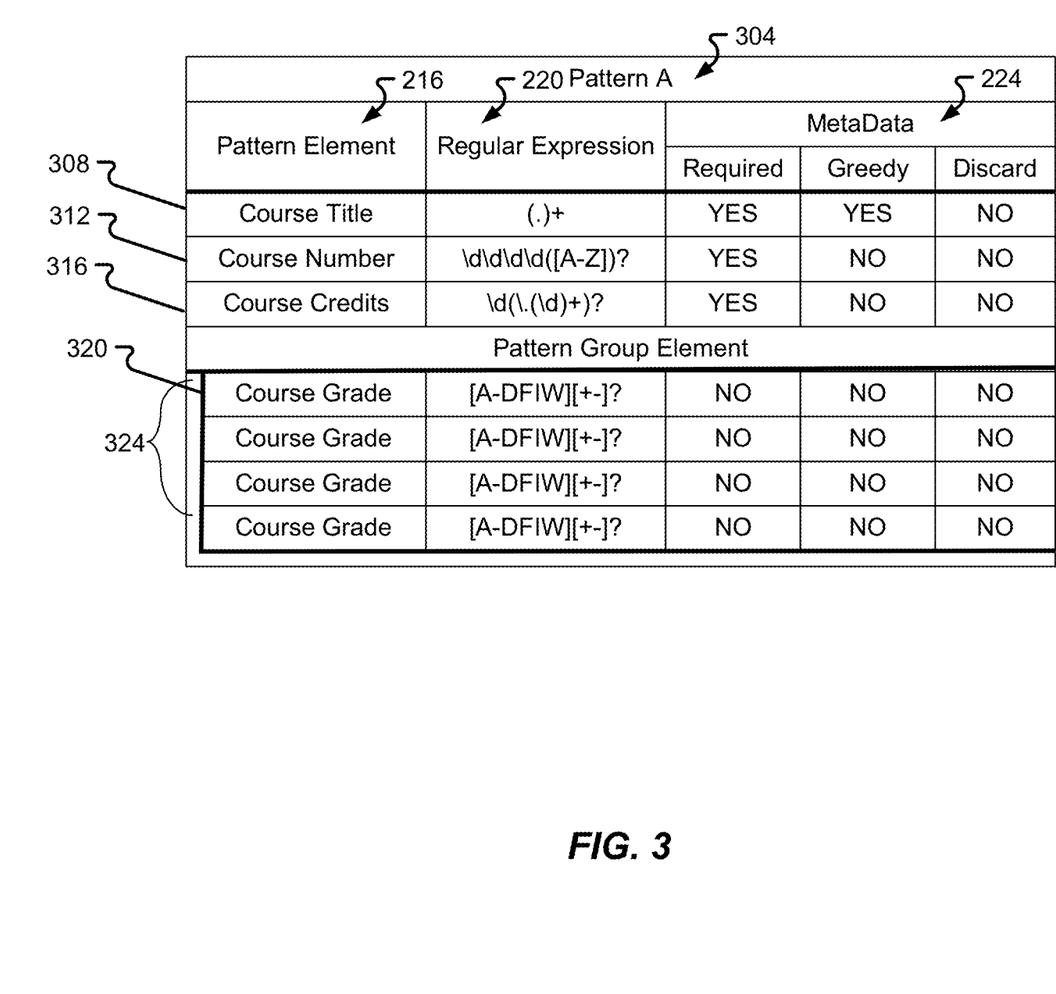
FIG. 3 illustrates a second example of a target pattern in accordance with embodiments of the present disclosure.

FIG. 3 depicts an example pattern 304 specific to an academic transcript. In the context of an academic transcript, non-limiting examples of pattern elements 216 may include a course title 308, such as "Algebra 1", a course number 312, such as "1001" or "1001A", a course grade 320 such as "A", "B", "C", "NP", "I", or "W", or a course credit 316 earned such as "3.0", "2", or "1.5". The pattern element 216 may utilize a regular expression to define the content as well as the format of the data that the pattern element 216 matches. As depicted in Pattern A 304 of FIG. 3, a pattern element 308 of "Course Title" may use the regular expression "(.)+" to denote that the course title 308 may comprise one or more new characters except for a new line. As another example, the pattern element 312 "Course Number" may use the regular expression "\d\d\d\d([A-Z])?" to denote that the course number 312 may comprise four digits followed by an upper case alphabetic character. As another example, the pattern element 316 "Course Credits" may comprise a single digit and optionally include a period followed by another digit. As another example, the pattern element 320 "Course Grade" may comprise a upper case alphabetic characters A-D, F, I, and W, optionally followed by an addition or subtraction symbol.

For a pattern element 216 to match a respective piece of data, the content of the pattern element 216 and/or format must match the pattern element's regular expression 220. For example, and in the context of academic transcripts, some course numbers 312 are always composed of four integer digits, optionally followed by a single capital alphabetic character, e.g., 1001 or 1001A. As previously discussed, a corresponding regular expression 220 to match a course number 312 would be (\d\d\d\d)([A-Z])?.

A pattern 304, such as Pattern A 304 depicted in FIG. 3, may optionally include a pattern element group 324. A pattern element group, as used herein, refers to a collection of pattern elements 216. The purpose of a pattern element group 324 is to allow a set of pattern elements 216 to be defined as not required but still require that at least one of the pattern elements 216 in the pattern element group 324 be matched within the electronic text document 136. For example, in instances where a course data pattern includes course grades that are reported for multiple semesters, terms, quarters, etc. for each course, all four pattern elements 308-320 (as depicted in Pattern A of FIG. 3) may not be required. That is, a course grade 320 may be recorded for a first quarter, a second quarter, a third quarter, and a fourth quarter of a course. Alternatively, a course grade 320 may be recorded only for a first and second semester. As another example, a course grade 320 may only be reported for a single semester. Therefore, the pattern element group 324 provides an option to include one or more course grades 320 for a single course. That is, the pattern element group 324 defines a pattern that contains pattern elements 216 for each potential course grade 320, but does not necessarily require all potential course grades. For example, and in accordance with a pattern group 320, a pattern, such as Pattern A 304 in FIG. 3, will only match text in an electronic document 136 if at least one course grade 320 is found.

Moreover, each pattern element 216 may include metadata describing the behavior of the element, such as what is the element required and what does the element represent. For example, as depicted in FIG. 3, Pattern A may include metadata 224 indicating whether each pattern element 216 is required, whether each pattern element 216 is greedy, and a value of a discard property for each pattern element 216. If a pattern element 216 is required, then the pattern 304 is only matched if all required pattern elements have corresponding matching data, in the correct sequence, as defined by the order of the pattern elements 216 in the pattern. For example, in order for Pattern A 304 to match some instance of text provided by an electronic document, the pattern elements "Course Title" 308, "Course Number" 312, and "Course Credits" 316 must be found in the electronic document 136, in order, and according to their regular expression.

Metadata 224 may also indicate whether a pattern element 216 is "greedy." If a pattern element 216 is greedy, the pattern element 216 will continue to consume text tokens from a sequence of OCR text tokens until the accumulated text no longer matches the pattern element 216. Alternatively, or in addition, the pattern element 216 will continue to consume text tokens from the sequence of OCR text tokens until the next text token is a match for the next required pattern element 304. For example, the pattern element "Course Title" 308 in FIG. 3 is greedy; that is, the metadata 224 associated with the "Course Title" 308 pattern element 216 includes a greedy attribute that indicates the pattern element 216 is greedy. Since the regular expression 220 denotes that the course title 308 may comprise one or more new characters except for a new line, the "Course Title" 308 pattern element 216 will proceed to consume text tokens from a sequence of OCR text tokens until the next text token is a match for the next required pattern element, in this case the pattern element of "Course Number" 312.

Metadata 224 may also indicate whether a pattern element 216 is to be discarded. If a pattern element 216 is to be discarded then the pattern element 216 is used to consume one or more text tokens but will not be part of the final result. For example, if the metadata 224 associated with a pattern element 216 includes a discard attribute that indicates the pattern element 216 is to be discarded (e.g., the discard property set to "YES"), then the pattern element 216 will not be included in the final result.

A pattern, such as Pattern A 304 in FIG. 3, is a sequence of fully defined pattern elements 216 and pattern element groups 324 that describe a collection of atoms of data in their proper order such as illustrated in the following example.

TABLE 1

| Example Target Data | | | | | |
|---|---|---|---|---|---|
| Course Number | Title | Sem 1 | Sem 2 | Sum 1 Sum 2 | Credits |
| 1021A | English 102 | D | | B | 3.0 |

Figure 4:
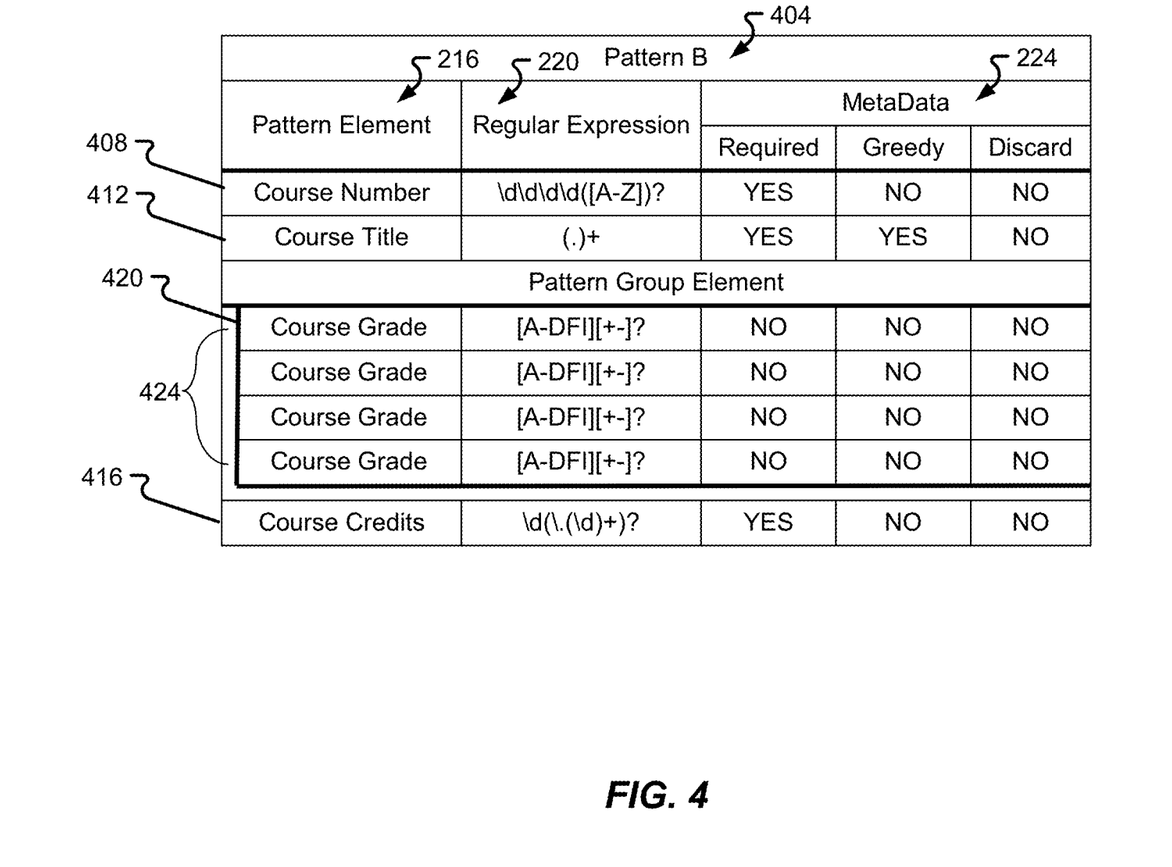
FIG. 4 illustrates a third example of a target pattern in accordance with embodiments of the present disclosure.

To extract data in the Example Target Data of Table 1, a pattern containing seven pattern elements 216 would be created. Additionally, four pattern elements 216 representing course grades 320 would be added to a pattern element group 324, wherein the pattern element group 324 is also part of the overall pattern. The pattern element group 324 will require that at least one of the four course grade elements 320 be found in order to find a match for the entire pattern. An example pattern 404 for extracting the data in the Example Target Data of Table 1 might resemble Pattern B 404 in FIG. 4.

Figure 5:
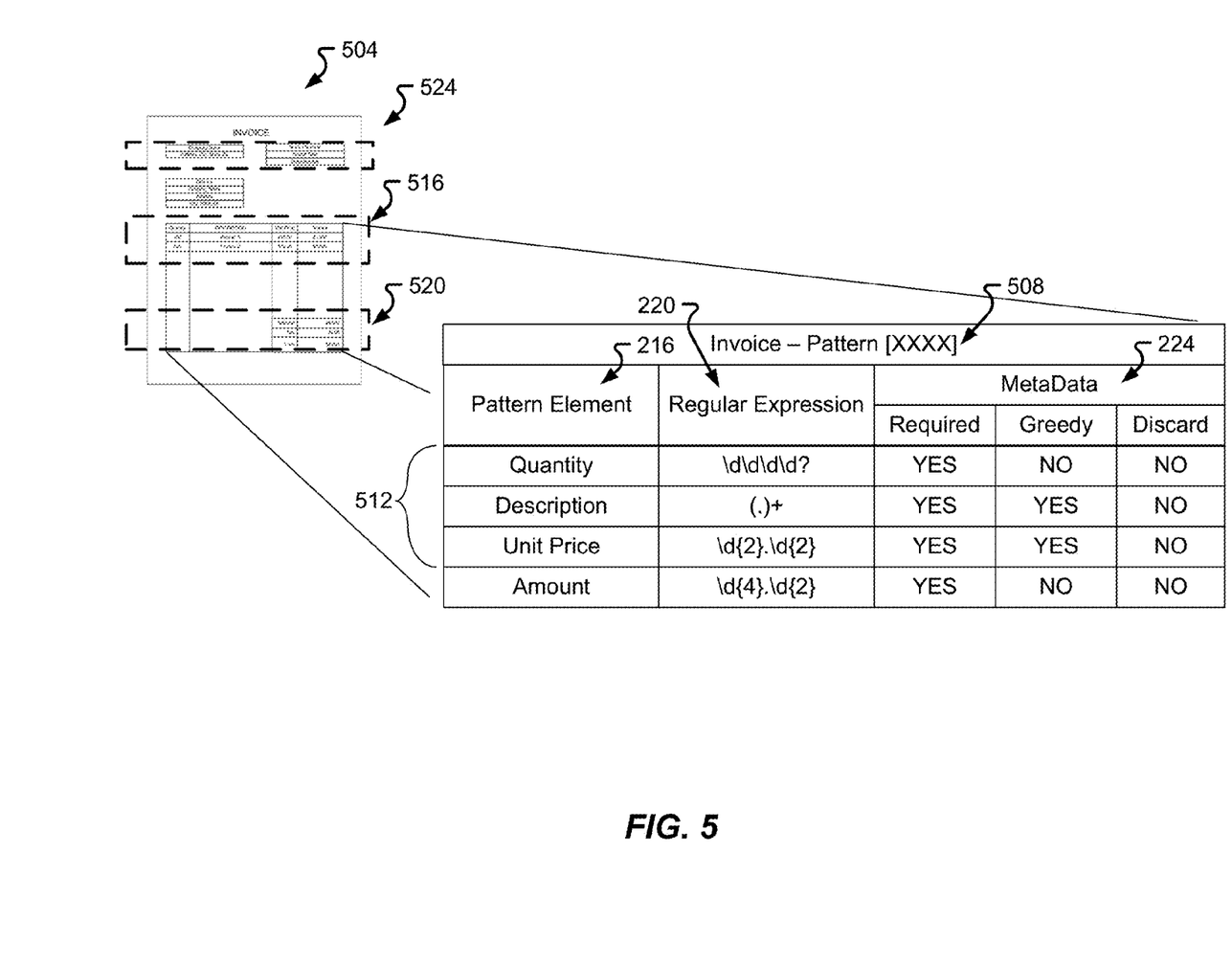
FIG. 5 illustrates a fourth example of a target pattern in accordance with embodiments of the present disclosure.
Figure 6A:
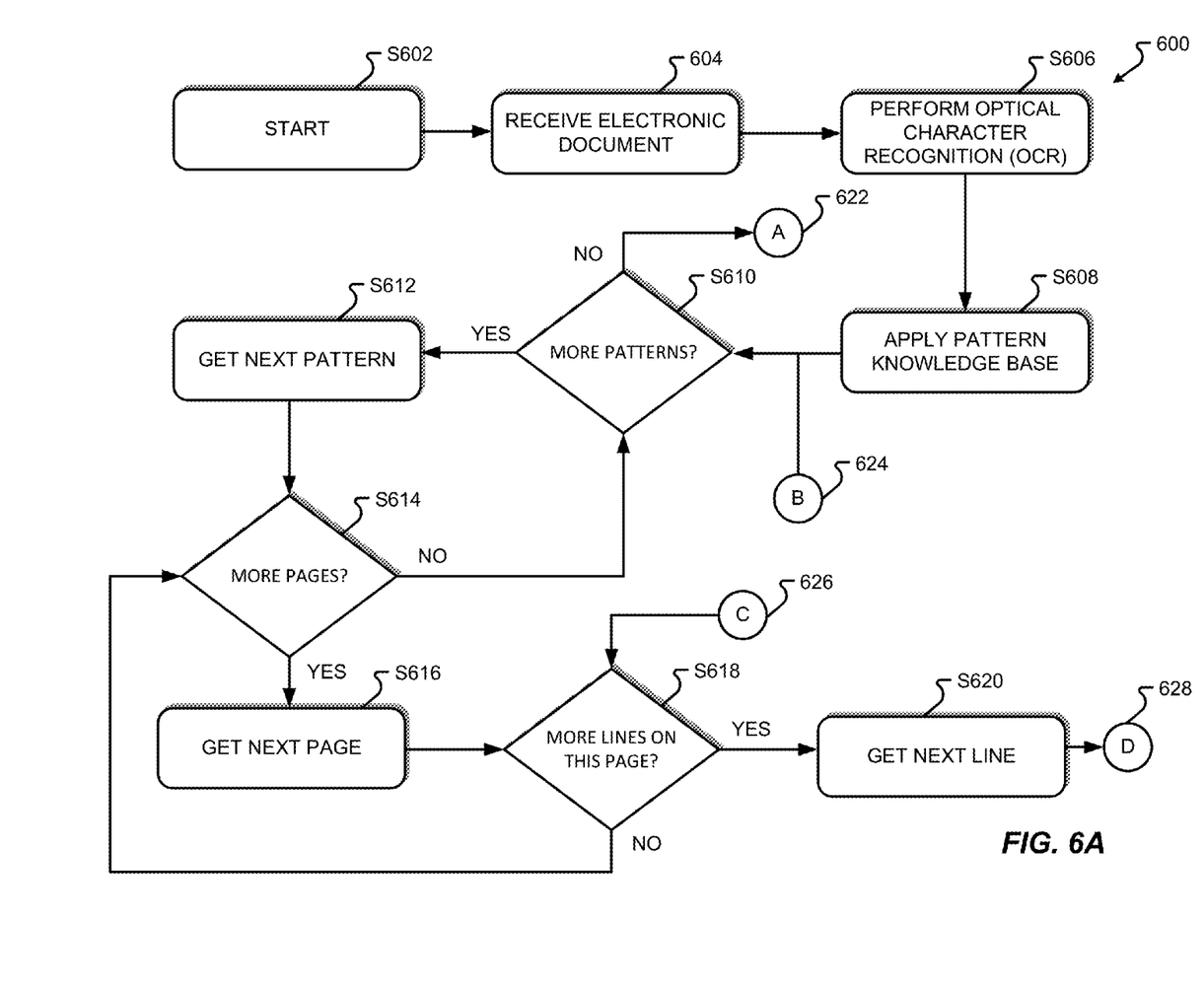
FIGS. 6A-6E illustrate a flow chart depicting details of at least one embodiment in accordance with embodiments of the present disclosure.
Figure 6B:
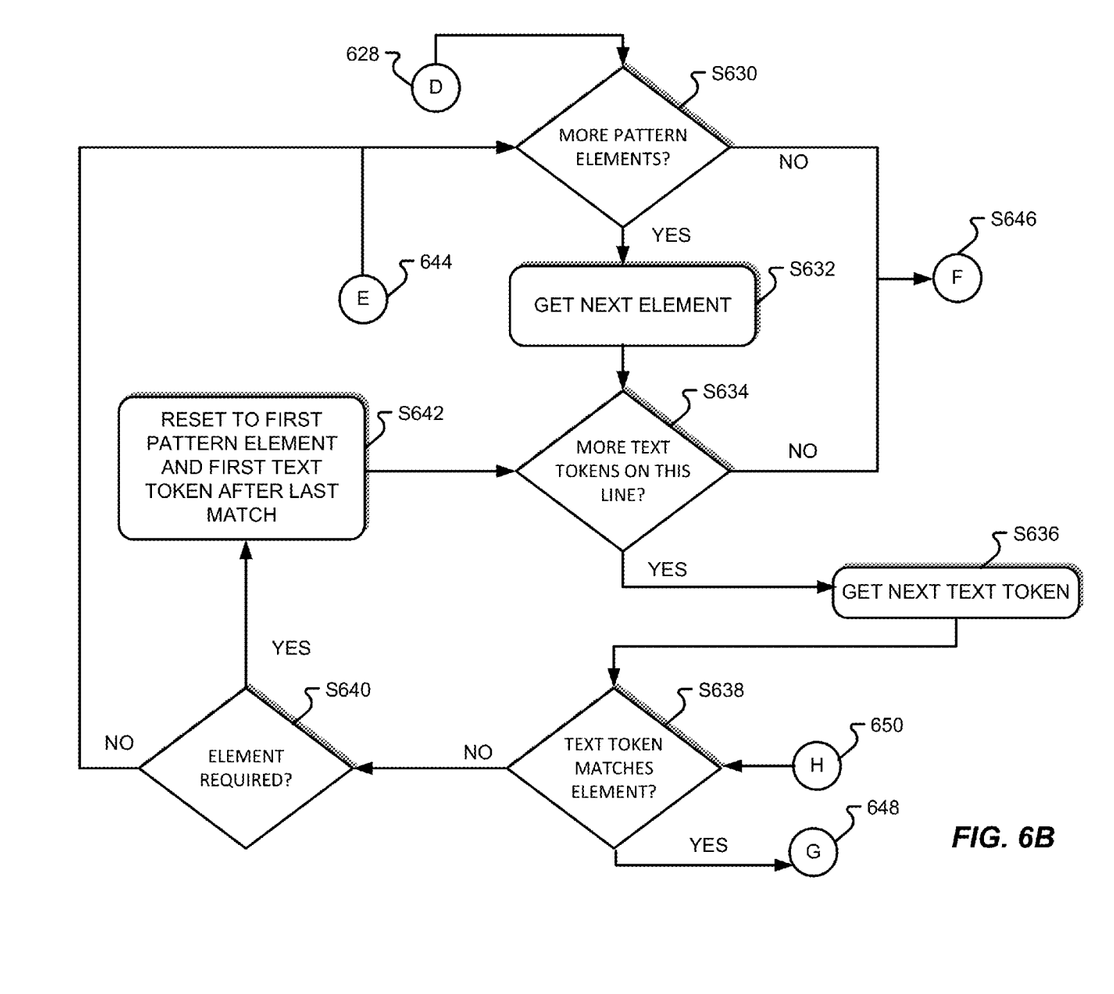
Figure 6C:
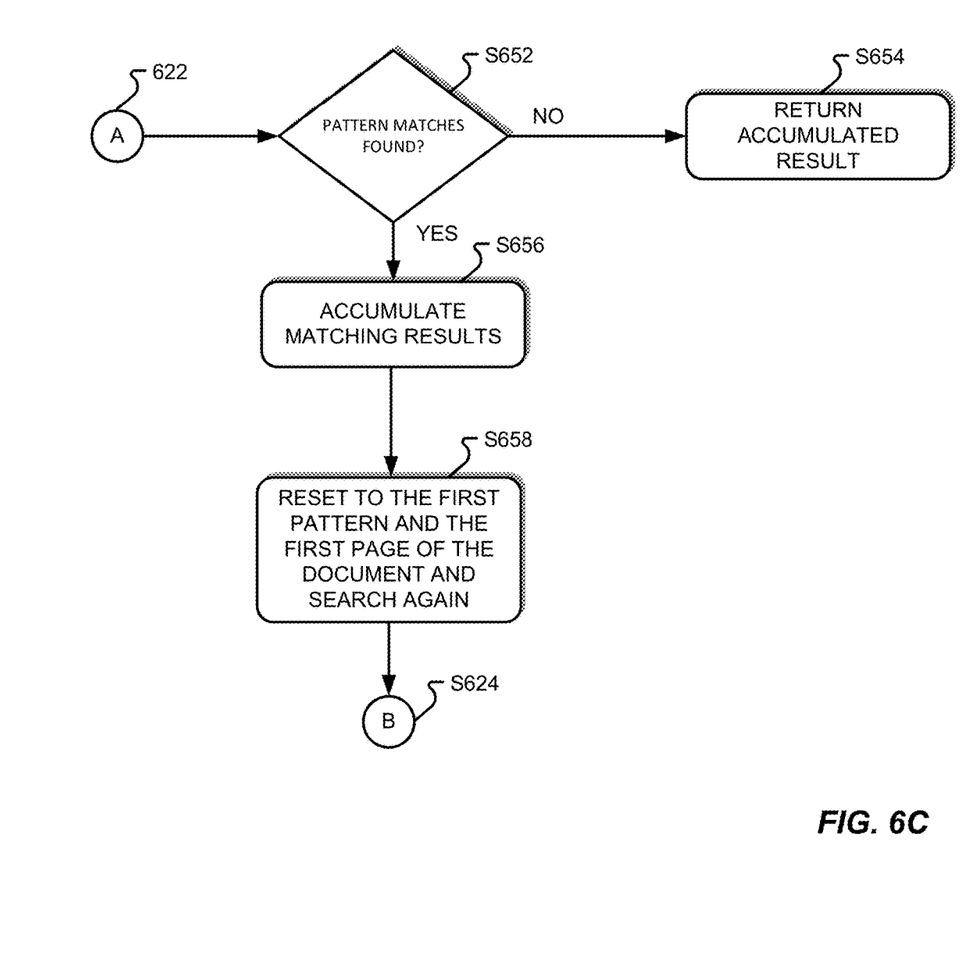
Figure 6D:
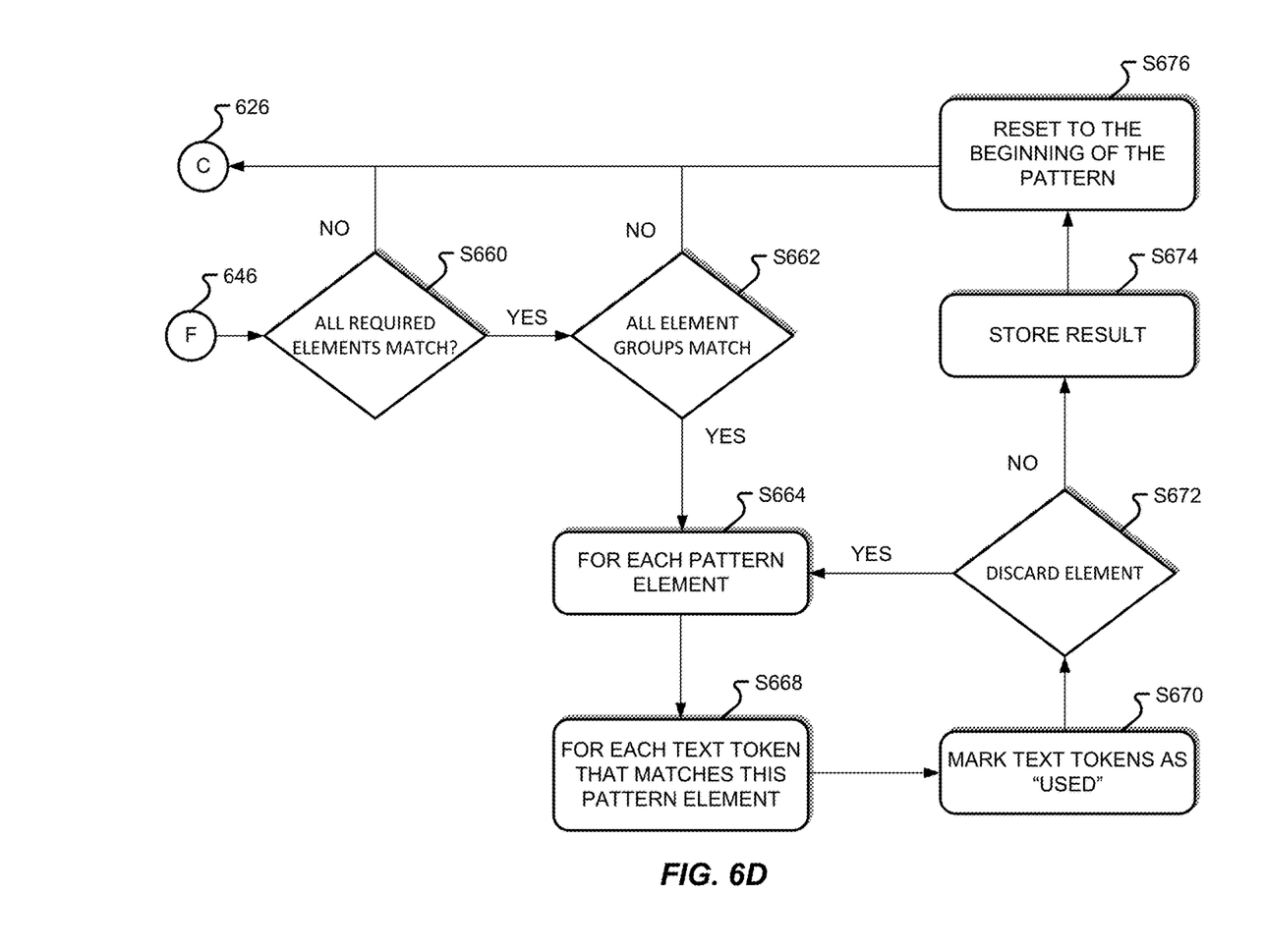
Figure 6E:
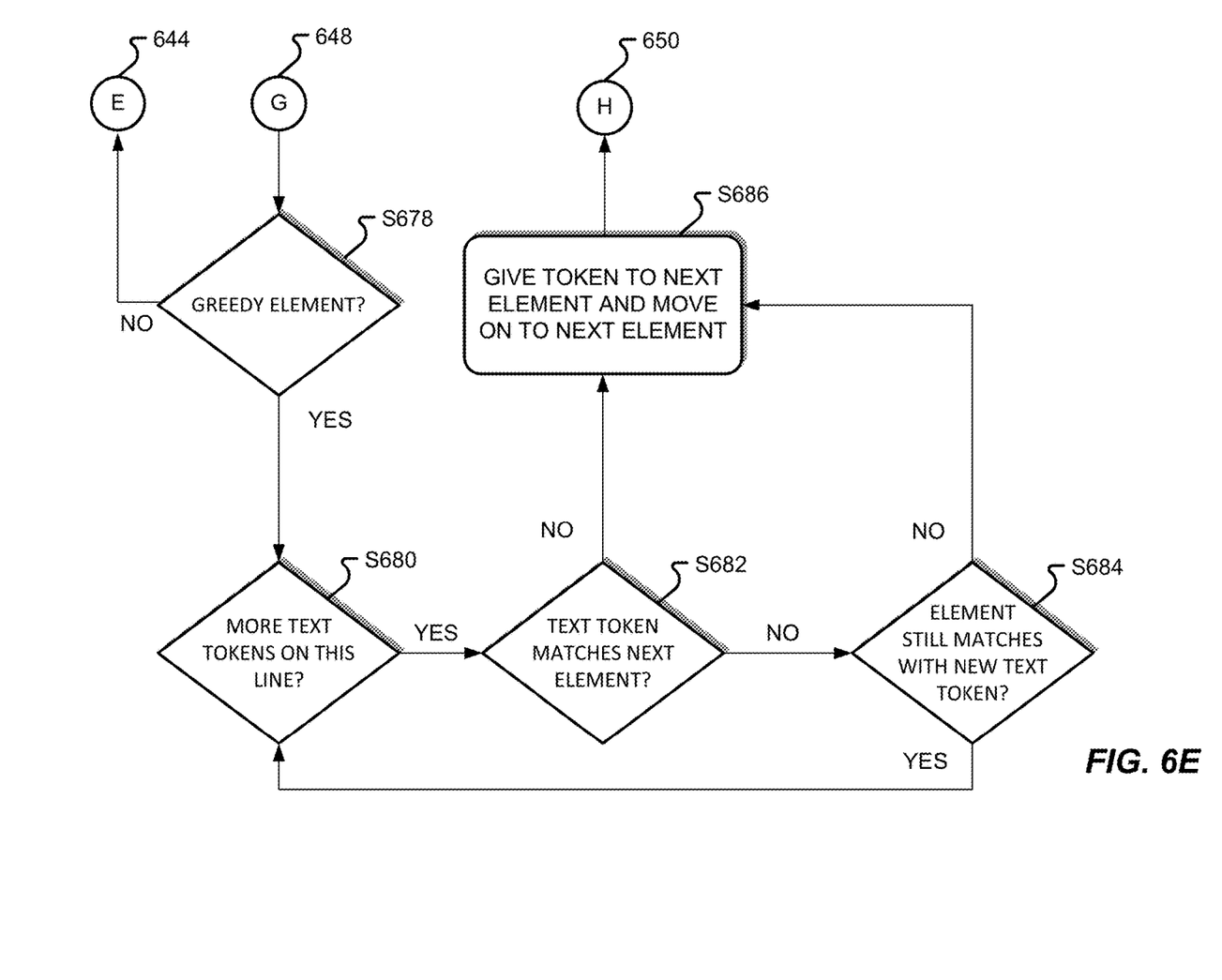

As illustrated in FIG. 5, an example of a pattern 508 utilized in conjunction with an invoice 504 and in accordance with at least one embodiment of the present disclosure is utilized. To extract data from the invoice 504 in FIG. 5, a pattern containing pattern elements 216 would be created. For example, pattern elements 512 representing Quantity, Description, Unit Price, and Amount would be utilized, where in this example, such pattern elements are required as indicated by the metadata 224. Such pattern elements 512 representing Quantity, Description, Unit Price, and Amount would be utilized to capture data in section 516 of the invoice 504 and/or electronic document 136. A different pattern may be utilized to capture data in sections 520 and 524. Alternatively, or in addition, additional pattern elements 216 and/or pattern groups may be added to Pattern 504 to capture the data in sections 520 and 524 of the invoice 504; such additional pattern elements may be required, greedy, and or discarded as indicated by the metadata 224.

To extract data from an electronic document 136, each pattern 212, 304, 404, and 508 from a repository of different patterns, such as pattern store 128, is searched for on each line of each page represented by the sequence of OCR text tokens. Any matching patterns are stored in a result set that is returned at the end of the process. Text tokens that are consumed while matching patterns are not re-used in any subsequent pattern matching. That is, if one or more text tokens are matched to a pattern, those text tokens are no longer searched for in the process of matching patterns. This search process is repeated until no matches can be found for any patterns.

Referring now to FIGS. 6A-6E, a method 600 of identifying and extracting data according to one or more patterns will be discussed in accordance with embodiments of the present disclosure. This method is in embodiments, performed by a device, such as a Text Identifier and Extractor 104. More specifically, one or more hardware and software components may be involved in performing this method. In one embodiment, one or more of the previously described hardware components perform one or more of the steps of this method. For example, the Pattern Recognizer 124 of the Text Identifier and Extractor 104 may perform one or more steps of the described method 600. The method 600 may be executed as a set of computer-executable instructions executed by a computer system and encoded or stored on a computer-readable medium. Hereinafter, the method shall be explained with reference to systems, components, modules, software, etc. described in FIGS. 1-5.

The method 600 of identifying and extracting data may continuously flow in a loop, flow according to a timed event, or flow according to a change in an operating or status parameter. The method 600 may be initiated at step S602 when an electronic document, such as an electronic document 136, is received at the Text Identifier and Extractor 104. Upon receiving the electronic document 136 at step S604, the Text Identifier and Extractor may perform an OCR process on the electronic document 136 to retrieve one or more sequences of text tokens at step S606. Next, at step S608, the Text Identifier and Extractor 104 may apply one or more patterns, for example from the patterns stored in the pattern store 128, to the sequences of text tokens received from the OCR process at step S606 using an existing or new knowledge base. For example, knowledge of a particular document type may determine or influence one or more patterns that are applied from the pattern store 128. The application of the patterns from the pattern store 128 generally starts at step S610, where it is determined if there are any more patterns in the pattern store 128, for example, that have yet to be applied to the sequence of tokens. If there are patterns to be applied, the method 600 may move to step S612 where the next pattern is retrieved from the pattern store 128. For example, in a first iteration of method 600, there will usually be one or more patterns that are to be applied.

The method 600 may then move to step S614 where it is determined whether there are additional pages in the electronic document 136 in which to search for the particular pattern. If there are no more pages to be searched, the method 600 returns to step S610. If there are more pages to be searched, for example, in a first iteration of method 600, the method 600 retrieves the next page, or the first page, at step S616 and proceeds to step S618 to determine if there are any more lines to search on the current page. If there are no more lines to search on the current page, the method 600 reverts to step S614. Otherwise, the method 600 proceeds to step S620 where the sequence of text for the next line is retrieved. In a first iteration of method 600, lines on the first page will exist and thus the method will move to S620. The method 600 then proceeds to step S630, as represented by page connector 628, where it is determined if there are any more pattern elements 212 for the current pattern. If there are more pattern elements, the method 600 proceeds to step S632, where the next pattern element, such as a pattern element 212, is retrieved from the pattern 208. The method 600 then proceeds to step S634 where it is determined whether there are any more text tokens on the current line. If additional text tokens for the current line exist, the method 600 proceeds to step S636 where the next text token is retrieved.

The method 600 then proceeds to step S638 where it is determined if the retrieved text token matches the current pattern element. If a match is found at step S638, the method 600 proceeds to step S678, as represented by page connector 648, where it is determined whether the pattern element is greedy based on the value, or indication, in the pattern element's greedy attribute. If there is not a match at step S638, the 600 method proceeds to step S640 where the method 600 proceeds to determine whether the pattern element is a required element. For example, the value of the pattern element's required attribute may be consulted. If the pattern element is not required, the method proceeds to step S630 where the method 600 proceeds to determine if another pattern element exists in the current pattern. If the pattern element is required at step S640, the method 600 proceeds to step S642 where the method 600 is reset to use the first pattern element and the first token in the sequence of tokens after the last match. The method 600 then proceeds to step S634 to determine if additional text exits on the current line.

If, at step S678, it is determined that the pattern element is not a greedy element, the method 600 proceeds step S630, as represented by page connector 644, where the method 600 determines if another pattern element exists in the current pattern. Otherwise, if the pattern element is a greedy element, the method 600 proceeds to step S680 where the method 600 determines if there are additional tokens on the current line. The method 600 then proceeds to step S682 where the method 600 determines if the text token matches the next pattern element. If the text token matches the next pattern element, the method 600 proceeds to step S686 where the token is provided to the next pattern element and the next pattern element in the pattern is retrieved. If, at step S682, the text token does not match the next pattern element, the method proceeds to step S684 where the method 600 determines whether the pattern element still matches the new text token. If the pattern element still matches the new text token, the method 600 proceeds to step S680. If, on the other hand, the pattern element does not match the new text token, the method 600 proceeds to step S686.

If, at either of step S630, it is determined that there are no more pattern elements in the current pattern, or at step S634, it is determined that there are no more text tokens on the current line, the method 600 proceeds to step S660, as shown by page connector 646, where the method 600 determines whether all the required pattern elements for the current pattern have been matched. If all of the required pattern elements for the current pattern have not been matched, the method 600 proceeds back to step S618 as shown by page connector 626. If all of the required pattern elements for the current pattern have been matched, the method proceeds to step S662 where the method 600 determines if all pattern element groups match. That is, at step S662, it is determined whether at least one of the pattern elements in the pattern group have been matched to a text token. If at least one of the pattern elements in the pattern group has not been matched, the method proceeds to step S618 as shown by page connector 626. If at least one of the pattern elements in the pattern group has been matched, the method proceeds to step S664 where, for each pattern element, and for each text token that matches the pattern element, the text token is marked as "used" in step S670. If the pattern element's value of the discard attribute indicates that the pattern element is to be discarded, the method proceeds to step S664. If, on the other hand, the pattern element's value of the discard attribute indicates that the pattern element is not to be discarded, the method proceeds to step S674 where the result is stored. The method then proceeds to step S676 where the method 600 resets back to the beginning of the current pattern and proceeds to step S618.

If, at step S610, the method 600 determines that there are no further patterns to apply, the method 600 proceeds to step S652 where it is determined whether any pattern matches have been found. If pattern matches have been found, the method 600 proceeds to step S656 where the result of the match is accumulated. The method then proceeds to step S658 where the method 600 resets to the first pattern and the first page of the electronic document to search again. If, at step 652, no pattern matches were found, the method 600 proceeds to step S654 where the accumulated result is returned.

Figure 7:
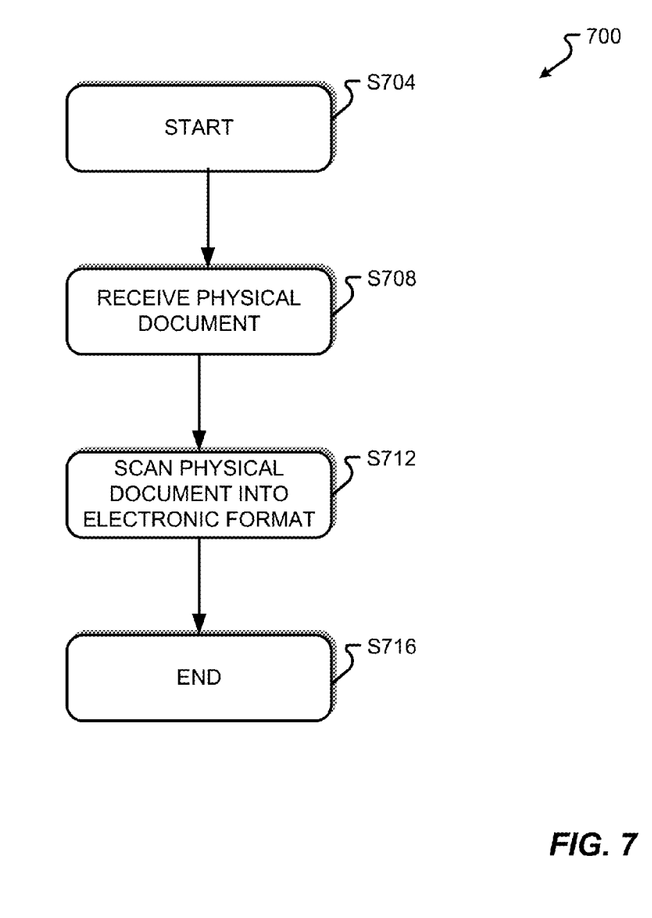
FIG. 7 illustrates further details with regard to the flow chart in FIGS. 6A-6E.

Referring now to FIG. 7, additional details with regard to method step 604 are discussed as method 700 in accordance with embodiments of the present disclosure. This method is in embodiments, performed by one or more devices of the text identification and extraction system 100. More specifically, one or more hardware and software components may be involved in performing this method. In one embodiment, one or more of the previously described hardware components perform one or more of the steps of this method. For example, the user input device 116 may perform one or more steps of the described method 700. The method 700 may be executed as a set of computer-executable instructions executed by a computer system and encoded or stored on a computer-readable medium. Hereinafter, the method shall be explained with reference to systems, components, modules, software, etc. described with FIGS. 1-6.

The method 700 may continuously flow in a loop, flow according to a timed event, or flow according to a change in an operating or status parameter. The method 700 may be initiated at step S704 when a physical document is received at the text identification and extraction system 100. Upon receiving the physical document at step S708, the document may be scanned at step S712 into an electronic format to generate electronic document 136. Method 700 may then end at step S716 where the electronic document is available to the reset of the method 600. In such a method, the physical document is transformed into an electronic document 136.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for identifying and extracting text from an electronic document, the system comprising:
   one or more processors;
   memory; and
   a text identifier and extractor that receives the electronic document, generates a stream of text tokens representing a plurality of lines of text of the electronic document, matches a pattern to a portion of the stream of text tokens, and outputs the text in accordance with the matched pattern,
   wherein,
      the pattern includes an ordered sequence of a plurality of pattern elements representing the plurality of lines of text,
      each pattern element of the plurality of pattern elements describes at least one text token,
      the text identifier and extractor matches a text token in the stream of text tokens to a pattern element and continues to consume text tokens from the stream of text tokens until a subsequent text token in the stream of text tokens is matched to a subsequent pattern element having a required attribute,
      the pattern element and the subsequent pattern element belong to the same pattern, and
      the electronic document is a transcript or certificate.

2. The system of claim 1, wherein at least one pattern element of the plurality of pattern elements describes the at least one text token according to a regular expression.

3. The system of claim 1, wherein the plurality of pattern elements further includes attributes that indicate whether a pattern element is one or more of greedy, required, and can be discarded.

4. The system of claim 1, further comprising at least one pattern element group, wherein the pattern element group includes a plurality of pattern elements.

5. The system of claim 4, wherein the pattern is further defined according to a sequence of pattern elements and pattern element groups.

6. The system of claim 1, further including a scanning input device, wherein the scanning input device transforms a physical document into the electronic document, and wherein the electronic document is an electronic representation of the physical document.

7. A method for identifying and extracting text from an electronic document, the method comprising:
   receiving, at a text identifier and extractor, the electronic document;
   generating a stream of text tokens representing a plurality of lines of text of the electronic document;
   matching a pattern to a portion of the stream of text tokens, the pattern including an ordered sequence of a plurality of pattern elements representing the plurality of lines of text, where each pattern element of the plurality of pattern elements describes at least one text token;
   matching a text token in the stream of text tokens to a pattern element and continuing to consume text tokens from the stream of text tokens until a subsequent text token in the stream of text tokens is matched to a subsequent pattern element having a required attribute, wherein the pattern element and the subsequent pattern element belong to the same pattern; and
   outputting the text in accordance with the matched pattern, wherein the electronic document is a transcript or certificate.

8. The method of claim 7, wherein at least one pattern element of the plurality of pattern elements describes the at least one text token according to a regular expression.

9. The method of claim 7, wherein the plurality of pattern elements further includes attributes that indicate whether a pattern element is one or more of greedy, required, and can be discarded.

10. The method of claim 7, further comprising at least one pattern element group, wherein the pattern element group comprises a plurality of pattern elements.

11. The method of claim 10, wherein the pattern is further defined according to a sequence of pattern elements and pattern element groups.

12. The method of claim 7, further comprising transforming a physical document into the electronic document, wherein the electronic document is an electronic representation of the physical document.

13. A non-transitory computer-readable storage medium including processor-executable instructions operable to perform a method comprising:
   receiving, at a text identifier and extractor, an electronic document;
   generating a stream of text tokens representing a plurality of lines of text of the electronic document;
   matching a pattern to a portion of the stream of text tokens, the pattern including an ordered sequence of a plurality of pattern elements representing the plurality of lines of text, where each pattern element of the plurality of pattern elements describes at least one text token;
   matching a text token in the stream of text tokens to a pattern element and continuing to consume text tokens from the stream of text tokens until a subsequent text token in the stream of text tokens is matched to a subsequent pattern element having a required attribute, wherein the pattern element and the subsequent pattern element belong to the same pattern; and
   outputting text in accordance with the matched pattern, wherein the electronic document is a transcript or certificate.

14. The non-transitory computer-readable storage medium of claim 13, wherein each of the plurality of pattern elements describes the at least one text token according to a regular expression.

15. The non-transitory computer-readable storage medium of claim 13, wherein the plurality of pattern elements further includes attributes that indicate whether at least one pattern element of the plurality of pattern elements is one or more of greedy, required, and can be discarded.

16. The non-transitory computer-readable storage medium of claim 13, further comprising at least one pattern element group, wherein the pattern element group comprises a plurality of pattern elements.

17. The non-transitory computer-readable storage medium of claim 16, wherein the pattern is further defined according to a sequence of pattern elements and pattern element groups.

* * * * *